Feb. 12, 1963 J. E. DRAIM ETAL 3,077,143
WATER LAUNCH OF FLOATING ROCKET VEHICLES
Filed May 6, 1960 2 Sheets-Sheet 1
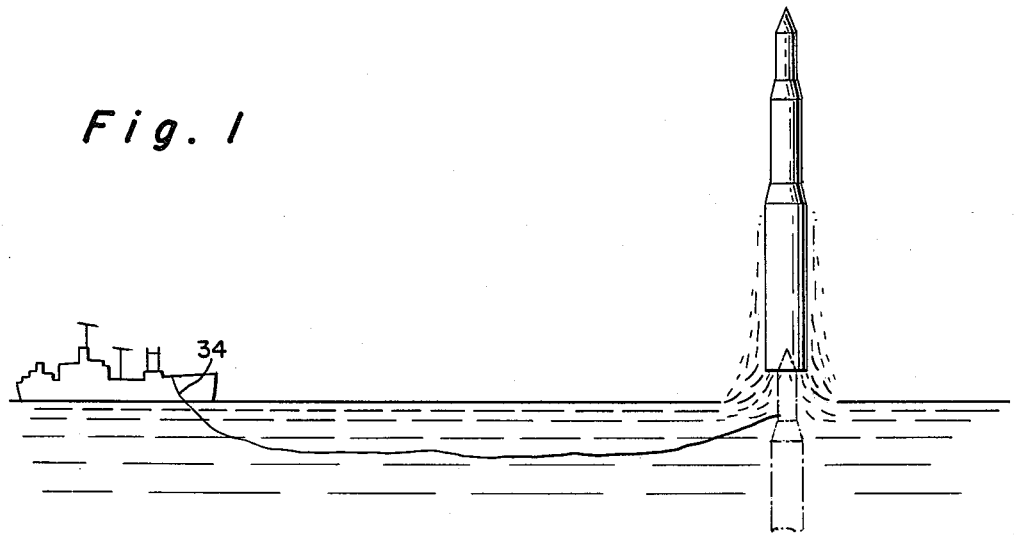
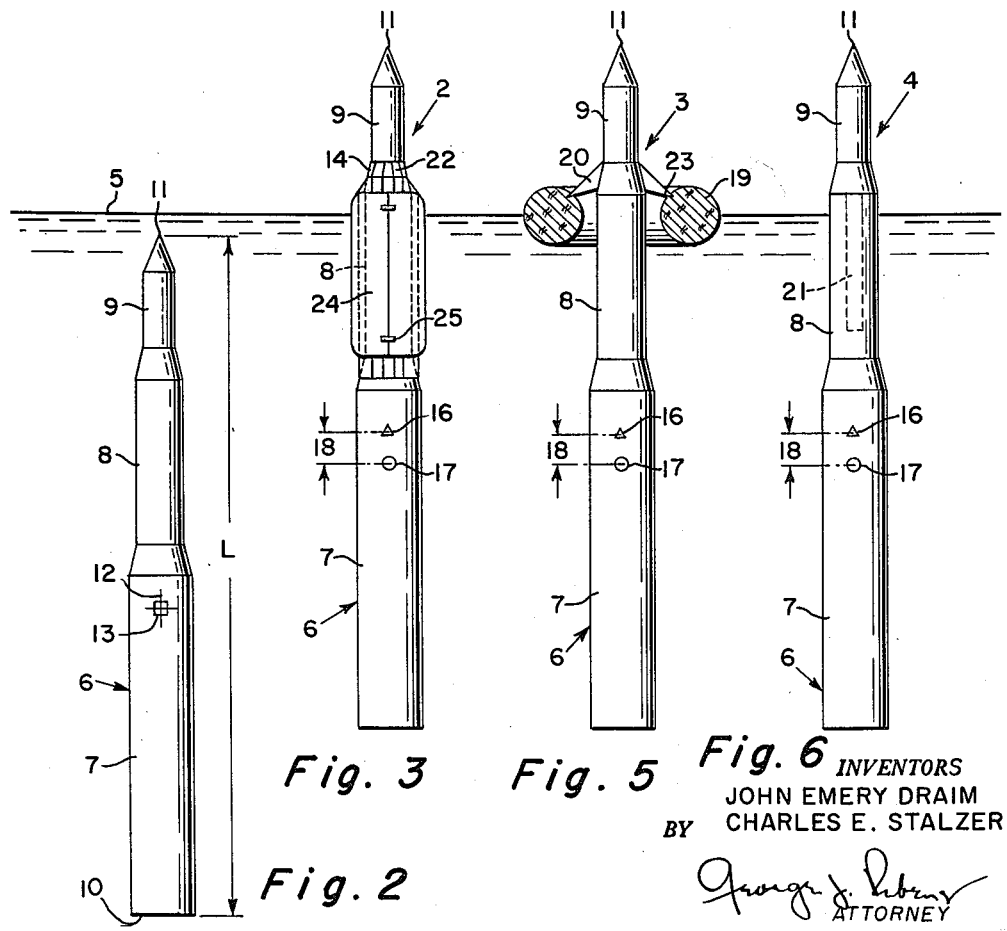
INVENTORS
JOHN EMERY DRAIM
BY CHARLES E. STALZER
*[signature]*
ATTORNEY Feb. 12, 1963  J. E. DRAIM ETAL  3,077,143
WATER LAUNCH OF FLOATING ROCKET VEHICLES
Filed May 6, 1960  2 Sheets-Sheet 2
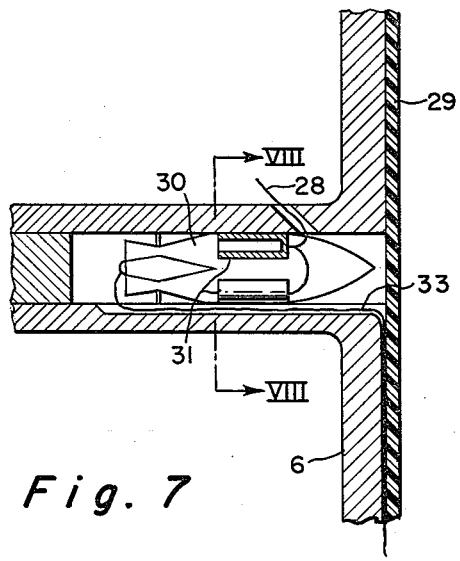
Fig. 7
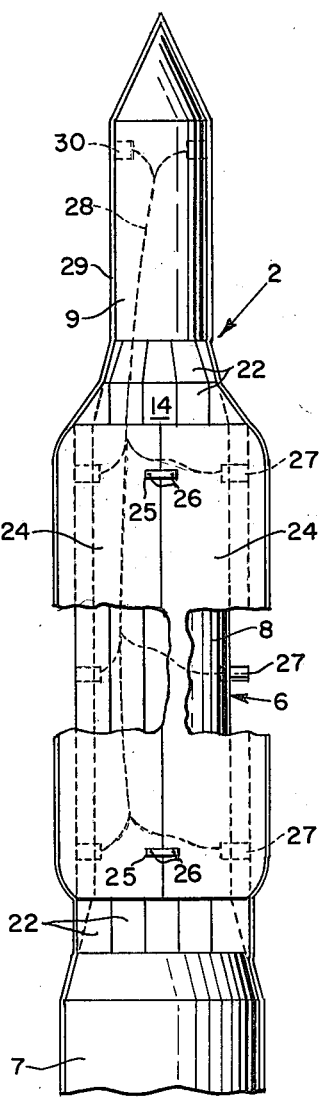
Fig. 4
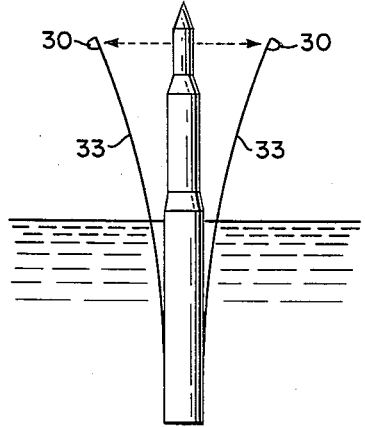
Fig. 8
Fig. 4(a)
Fig. 9
INVENTORS
JOHN EMERY DRAIM
CHARLES E. STALZER
BY
ATTORNEY

United States Patent Office 3,077,143
Patented Feb. 12, 1963

3,077,143
WATER LAUNCH OF FLOATING ROCKET
VEHICLES
John Emery Draim, 1436 W. Beverly Drive, Oxnard,
Calif., and Charles E. Stalzer, 2221 Grandview Drive,
Camarillo, Calif.
Filed May 6, 1960, Ser. No. 27,459
9 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a floatable water-launched rocket vehicle and more particularly to a rocket vehicle having a predetermined amount of buoyancy at a preselected location to give launching stability.

Heretofore, little attention has been given to launching a rocket vehicle at sea. The present method of launching large pay loads into earth-centered orbits or deep space missions is from a land-based facility which inherently requires extensive support equipment costing three to five times as much as the rocket vehicle itself. The present invention eliminates equipment such as fuel and oxidizer storage facilities, cryogenics systems, concrete launching pads, large steel gantries and armored block houses by providing a rocket vehicle which can be launched from water. Of particular importance, the present invention enables seventy percent of the earth's surface to become a potential launch site since the rocket vehicle can be towed and erected for launch literally anywhere at sea as described in a U.S. patent application, Serial No. 31,243 filed by John Emery Draim and Charles E. Stalzer. Further, phenomenal safety is inherent in a water-launched rocket vehicle since any explosion due to a malfunctioning of the rocket vehicle will be absorbed by the surrounding water thereby eliminating injuries to personnel and eliminating replacement or repairing of support equipment.

It is apparent then, that the present invention obviates many of the problems encountered in launching a rocket vehicle from land by providing a rocket vehicle which can be launched from water. Generally, a rocket vehicle has a specific gravity of from 1.02 to 1.40 (using sea water as a reference). It is clear that such a rocket vehicle will sink and has no stability for launching purposes. The center of gravity of such a rocket vehicle will substantially coincide with its center of buoyancy, the latter being the C.G. of the displaced volume of water occupied by the rocket vehicle. In order to make the launching of a rocket vehicle from the water feasible, it must float upright with sufficient rolling and dipping stability to give a practical launch position. This is accomplished in the present invention by providing buoyancy of a specific amount in a preselected position with relation to the rocket vehicle. The body of the rocket vehicle, exclusive of any additional buoyancy, has an original C.G. and an original center of buoyancy. The present invention involves adding an additional amount of buoyancy to the body of the rocket vehicle above the original C.G. so that the final body of the rocket vehicle will have a positive metacentric height, i.e., the final center of buoyancy of the body will be closer to the intended nose portion of the rocket vehicle than is the final C.G.

The present invention particularly locates the additional buoyancy with relation to the body of the rocket vehicle so that launching stability is attained for firing the rocket. This is accomplished by adding sufficient buoyancy as explained above so as to set the metacentric height of the rocket vehicle at a length which is less than four-tenths of the total length of the body of the rocket vehicle. With such a metacentric height the rocket vehicle will have little tendency to roll away from a vertical position in response to waves, giving the rolling stability which is required for launch. Also, the invention involves various ways of distributing additional buoyancy on the body portion so as to attain a desired dipping (up and down motion) stability of the rocket vehicle when there is wave motion on the water. Thus, if greater dipping stability is required in order to maintain the rocket vehicle substantially stationary in the water regardless of the wave motion, the additional buoyancy would be elongated and positioned transverse to the surface of the water.

It is to be noted for the purposes of this description the invention is being described as adding buoyancy at a preselected position on the body of an existing rocket vehicle; however, it is to be understood that the invention also contemplates the construction of a rocket vehicle which has the required buoyancy designed into it. For instance, it will be apparent from the description that a floatable water-launched rocket vehicle designed with a buoyant void of a predetermined volume located at the preselected position is contemplated by the invention.

Accordingly, an object of the present invention is to provide a floatable rocket vehicle which is capable of being launched from water.

Another object is to provide a rocket vehicle which has sufficient launch stability for delivering large pay loads into earth-centered orbits or deep space probes.

A further object of the present invention is to provide a method of launching a rocket vehicle for delivering large pay loads into earth-centered orbits or deep space probes.

A still further object is to provide a means for releasing any additional buoyant material from a water-launched rocket vehicle.

Another object is to provide a means for releasing a water-tight envelope from a rocket vehicle.

Other objects and many of the attendant advantages of this invention will be readily apparent as the same become better understood by reference to the following detailed description when considered in connection with the accompanying drawings wherein;

FIG. 1 is a perspective view of a rocket vehicle being launched by a supporting ship;

FIG. 2 is a side view of the body of a rocket vehicle which has a specific gravity more than the water which it displaces;

FIG. 3 is a side view of an embodiment of the invention showing buoyant material added immediately adjacent the exterior of the body of a rocket vehicle;

FIG. 4 is an enlarged side view of a portion of the rocket vehicle shown in FIG. 3 with portions cut away.

FIG. 4(a) is a top view of the rocket vehicle shown in FIG. 4 with a portion cut away to show a partial cross section of the rocket vehicle.

FIG. 5 is a side view of a further embodiment of the invention showing a buoyant ring having an internal diameter that is greater than the maximum external diameter of the rocket vehicle;

FIG. 6 is a side view of a still further embodiment of the invention showing the provision of additional buoyancy within the interior of the body of the rocket vehicle.

FIG. 7 is a cross-sectional view of a device for tearing a water-tight envelope which encases the rocket vehicle;

FIG. 8 is a cross-sectional view taken along line 8—8 in FIG. 7; and

FIG. 9 is a side view of the rocket vehicle showing the water-tight envelope stripping device in operation.

Referring now to the drawings wherein like reference numerals designate similar parts throughout the several views, there is shown in FIG. 2 a body 6 of a rocket vehicle having a first stage 7, a second stage 8 and a third stage 9, the first stage having a bottom 10 and the third stage having a top 11. The body 6 is of a length (L) from its bottom 10 to its top 11 and, for the purpose of illustration, has a specific gravity which is greater than the water it displaces. It follows then that the body 6 will have an original center of gravity 12 which substantially coincides with its original center of buoyancy 13 resulting in a metacentric height which is substantially zero. Since there is no righting moment of the body 6, it will sink aimlessly in the water without direction, making it apparent that a launch thereof would be impossible. As shown in FIG. 3 the present invention attains launching stability by adding a substantially impervious buoyant jacket 14 to the exterior of stage 8 of the body 6 above the original C.G. 12. A rocket vehicle 2 is then completed which has a final center of buoyancy 16 located above a final center of gravity 17. It is to be noted that the rocket vehicle 2 assumes a final center of gravity and a final center of buoyancy which is different from the original center of gravity and the original center of buoyancy of the body 6 shown in FIG. 2. The positioning of the buoyant jacket 14 on the body 6 locates the final center of buoyancy 16 between the final C.G. 17 and the top 11 enabling the rocket vehicle 2 to erect itself vertically with the top 11 in an upward position in relation to the surface 5 of the water. In order to give a desirable launching stability to the rocket vehicle it has been found that its metacentric height must be less than four-tenths of the length (L) of the body 6. Since the addition of the buoyant material above the original C.G. of the body 6 will increase the proportion of the metacentric height to the length (L), it is apparent that a particular range of volumes of additional buoyancy will be applicable in keeping this proportion below four-tenths. By keeping the metacentric height small (less than fourth-tenths the total length of the body) the rocket vehicle will have little tendency to roll away from a vertical position. Accordingly, the period of motion of the rocket vehicle will be considerably longer than the period of the average wave motion on the water resulting in a rocket vehicle having that rolling stability which is required for launch. The dipping stability of the rocket vehicle, when there is wave motion on the water, is dependent upon the longitudinal distribution of the buoyancy along the body of the rocket vehicle, and since the buoyant jacket 14 has a large longitudinal distribution in contrast to its transverse distribution along the body, the rocket vehicle will have large dipping stability, i.e., it will not readily follow the up and down motion of the wave. The embodiment shown in FIG. 3, then, is a floatable water-launched rocket vehicle which will remain substantially stationary in the water, dipping into any wave motion which may occur. Further, it is intended that the embodiment of the rocket vehicle shown in FIG. 3 release the buoyant jacket 14 at the time of launch or at any other predetermined time. In order to accomplish this the buoyant jacket 14, as best shown in FIG. 4, is divided into a plurality of jacket strips 22 which are longitudinally aligned with the longitudinal axis of the rocket vehicle 2. Encasing the jacket strips 22 is a sleeve divided into a plurality of sleeve strips 24, all adjoining sleeve strips being riveted by rivets 26 to frangible connectors 25. Mounted within the body 6 and the buoyant jacket 14 are a plurality of explosive squibs 27 connected to a common igniter lead 28 so that when the igniter lead 28 carries an electrical current the squibs 27 will explode breaking connectors 25 and cast off sleeve strips 24 thereby allowing the jacket strips 22 to be released from the body 6.

A rocket vehicle 3, as shown in FIG. 5, has a brace 20 which rests on a buoyant doughnut-shaped float 19. The buoyant float 19 is positioned between the original C.G. 16 of the body 6, and the top 11 and is of such a volume that the metacentric height 18 of the rocket vehicle is less than four-tenths of the length (L) of the body 6 giving the rocket vehicle good rolling stability as described above. The buoyant float 19, as shown in FIG. 5, will give little dipping stability at the water level shown, since the longitudinal distribution of buoyant material with respect to the body 6 compares substantially equal with the transverse distribution of the buoyant material. Thus, the rocket vehicle shown in FIG. 5 is a floatable water-launched rocket vehicle which will have a form of water line stability in which it will substantially follow the wave motion of the water. The release of float 19 from the rocket vehicle occurs at the time of launch and is accomplished by providing brace 20 with support ends 23 which merely rest on the exterior of the float 19. Upon launch of the rocket vehicle 3, the body 6 and the brace 20 cease to rest on the float 19 and literally rocket away from the float.

A rocket vehicle 4, shown in FIG. 6, has a buoyant void 21 which is located within the interior of the second stage 8 above the original C.G. 12 of the body 6. The buoyant void 21 is of such a volume that the metacentric height 18 of the rocket vehicle 4 is less than four-tenths of the total length (L) of the body 6, giving the rocket vehicle good rolling stability as described above. Since the buoyant void 21 in FIG. 6 has a considerably larger longitudinal distribution on the body 6 than a transverse distribution, the rocket vehicle 4 will have a large dipping stability—i.e., it will not readily follow the wave motion of the surface 5 of the water. It is to be understood that the rocket vehicle could be designed with a buoyant void 21 by providing a predetermined size of propellant grain center to give a positive metacentric height which is less than four-tenths of the total length (L).

Since the rocket vehicle will be exposed to water and air, attention must be given to preventing corrosion of the exterior of the rocket vehicle. A means to accomplish this is shown in FIG. 4 wherein the entire rocket vehicle or a portion thereof is encased in a releasable water-tight envelope 29. The envelope 29 may be of a thin coating of plastic or Chemisol, either of which can be sprayed on the rocket vehicle. In order to ensure that the envelope does not stick to the rocket vehicle upon launch, the latter can be sprayed or covered with a light coating of oil prior to applying the envelope. Removal of the envelope 29 at launch or any other desired time is accomplished by miniature rockets 30 encased in the body 6, the details of which are shown in FIGS. 7 and 8. The miniature rockets 30 have three fuel bodies 31, each of which is connected to the common igniter lead 28. A stripping wire 33, located along the rocket vehicle between the latter and the water-tight envelope 29, is attached at each end to a miniature rocket 30 so that when the miniature rockets are fired, the latter will pull the stripping wire 33 from the rocket vehicle, thus tearing the envelope 29. It is intended, if the entire rocket vehicle is encased by envelope 29, that the portion of the envelope on the rocket vehicle 2 above the miniature rockets 30 be cut away prior to the above described stripping so that the envelope 29 below the miniature rockets 30 will fall away after the tearing operation. However, it is readily apparent that the top envelope portion could be stripped by the same type of means that is used to strip the lower portion—namely, running a stripping wire over the upper portion of rocket vehicle and attaching each end of this wire to a miniature rocket.

FIG. 1 illustrates any of the above described rocket vehicles being fired by a supporting ship. A control line 34 leading from the ship to the rocket vehicle is for firing the rocket vehicle and applying current to the common igniter lead 28. It is contemplated, however, that radio control could be used in lieu of line 34.

The invention also contemplates the reduction of wave motion to gain additional stability. This is accomplished by spreading oil on the surface of the water at the location of the rocket vehicle. The oil will attenuate the wave motion thus giving greater overall stability to any of the three embodiments described above.

It is now evident that the above described invention provides a floatable rocket vehicle which has sufficient stability for launch from the water. Accordingly, the invention has capitalized on all the attendant advantages such as mobility, less equipment, and natural built-in safety. Further, the invention has provided means for releasing that equipment which is not required after launch thereby ensuring good aerodynamic qualities. It is also shown that the vehicle can be floated and launched without a complete encapsulation, with major portions of the rocket vehicle itself exposed to the water.

Obviously many modifications and variations of the present invention are possible in the light of the above teachings. It is therefore to be understood that within the scope of the appended claims the invention may be practiced otherwise than as specifically described.

We claim:

1. An apparatus comprising an elongate missile having a top, a bottom rocket end, and a particular center of buoyancy when vertically-disposed with its top up in a body of water, the missile having a limiting point on its longitudinal axis located four-tenths of its length from its center of gravity between its center of gravity and said top, the missile having a transverse portion extending from the center of buoyancy to a point on the longitudinal axis between the center of buoyancy and said limiting point and said apparatus further having buoyancy means operably connected to the missile for giving the apparatus a positive metacentric height less than four-tenths the total length of the missile, said buoyancy means located entirely between the center of gravity and the top so as to be clear of the rocket end and having at least a portion submerged below the water's surface, the submerged portion of the buoyancy means having a volume in cubic feet equal to $$\frac{W}{Z-P}+\frac{E}{Z}$$

where W equals the weight of the missiles transverse portion in pounds, Z equals the unit weight of the body of water in pounds per cubic foot, P equals the absolute unit weight of the buoyancy means in pounds per cubic foot and E equals the weight of any emerged portion of the buoyancy means in pounds whereby the missile will float upwardly in the body of water in a launching position and is launched therefrom by exhausting the rocket end directly into the water immediately upon firing.

2. An apparatus floatable in a body of water comprising an elongate missile launchable into air from the water, said missile having a nose end and an exhaust nozzle end, said apparatus having a center of gravity and a center of buoyancy, and said apparatus further having buoyancy means for establishing said center of buoyancy between said center of gravity and said nose end so that the missile will be floated substantially upright in the water, said buoyancy means being operably connected to the elongate missile to give the elongate missile a positive metacentric height less than four-tenths the total length of said elongate missile, said buoyancy means being located between the center of gravity and the nose end of said elongate missile and having at least a portion submerged below the water surface, no portion of said apparatus extending substantially within the flow of exhaust gases from said nozzle so that the gases can be discharged directly into the water without confinement by the apparatus, whereby upon missile firing water adjacent the nozzle is displaced to prevent explosive forces of the exhaust gases from being adversely exerted on the missile.

3. An apparatus floatable in a body of water comprising an elongate missile launchable into air from the water, said missile having a nose end and an exhaust nozzle end, said apparatus having a center of gravity and a center of buoyancy, and said apparatus further having buoyancy means for establishing said center of buoyancy between the center of gravity and said nose end so that the missile will be floated substantially upright in the water, a major portion of said buoyancy means operably connected to the elongate missile to give the elongate missile a positive metacentric height less than four-tenths the total length of said elongate missile, said buoyancy means being located between the center of gravity and the nose end of said elongate missile and having at least a portion submerged below the water's surface, and no portion of said apparatus extending substantially within the flow of exhaust gases from said nozzle so that the gases can be discharged directly into the water without confinement by the apparatus whereby upon missile firing water adjacent the nozzle is displaced to prevent explosive forces of the exhaust gases from being adversely exerted on the missile.

4. An apparatus as claimed in claim 2 wherein the buoyancy means is located entirely within the missile.

5. An apparatus as claimed in claim 2 wherein the buoyancy means is elongated and is substantially aligned with the longitudinal axis of the missile whereby the apparatus will have good dipping stability in the water.

6. An apparatus as claimed in claim 2 wherein said buoyancy means is separably located around the exterior of the missile and said apparatus further has means releasably supporting the missile by said buoyancy means.

7. An apparatus floatable in water comprising an elongate missile launchable into air from the water, said missile having a nose end and a jet exhaust end and said apparatus having a center of gravity and a center of buoyancy, a jacket snugly fitting about the exterior of the missile between said center of gravity and said nose end and having a buoyancy such that said center of buoyancy is established between the center of gravity and said nose end so that the missile will be upwardly positioned in the water, the distance between the center of gravity and the center of buoyancy being less than four-tenths the total length of the missile, and the jet exhaust end being unobstructed by the jacket so that upon firing the missile in the water exhaust gases are emitted directly into the water thereby avoiding undesirable forces being exerted on the missile, said jacket being divided into a plurality of longitudinal jacket strips, a sleeve encasing said jacket strips, said sleeve being divided into a plurality of longitudinal sleeve strips, means for releasably securinng the sleeve strips and separating means for parting the sleeve strips from said jacket strips so that said jacket strips will fall away from said missile.

8. An apparatus as claimed in claim 7 including a water-tight envelope encasing said apparatus and stripping means mounted on said apparatus for cutting said envelope away from said apparatus.

9. An apparatus as claimed in claim 8 wherein said stripping means comprises at least one miniature rocket mounted in said apparatus, a stripping wire between said water-tight envelope and said apparatus, one end of said stripping wire being attached to said miniature rocket so that when the miniature rocket is fired the stripping wire will cut the water-tight envelope.

References Cited in the file of this patent

UNITED STATES PATENTS

| | | |
|---|---|---|
| 519,161 | Richter | May 1, 1894 |
| 1,707,112 | Browne | Mar. 26, 1929 |
| 2,790,186 | Carapellotti | Apr. 30, 1957 |
| 2,910,834 | Knapp | Nov. 3, 1959 |

FOREIGN PATENTS

| | | |
|---|---|---|
| 1,110,465 | France | Oct. 12, 1955 |

OTHER REFERENCES

Aviation Week, April 21, 1958, page 31, Compressed Air to Shoot Polaris from Submarine to Surface. (Copy in Div. 10), 89–1.7B.

Missiles and Rockets, January 1957, pages 18 and 19, Break-up in Army-Navy Jupiter Program. (Copy in Div. 10), 89–1.7B.

Missiles and Rockets, June 29, 1959, page 17, Missile Support. (Copy in Div. 10), 89–1.7B.